United States Patent
Flores Miranda et al.

(10) Patent No.: US 10,833,904 B2
(45) Date of Patent: Nov. 10, 2020

(54) DISTRIBUTED AND SCALABLE PHYSICAL LAYER AND MEDIUM ACCESS DESIGN FOR UPLINK MULTIUSER MULTIPLE-INPUT, MULTIPLE-OUTPUT (MU-MIMO) IN WIRELESS LOCAL AREA NETWORK (WLAN) SYSTEMS

(71) Applicant: William Marsh Rice University, Houston, TX (US)

(72) Inventors: Adriana B. Flores Miranda, Houston, TX (US); Edward W. Knightly, Houston, TX (US)

(73) Assignee: William Marsh Rice University, Houston, TX (US)

( * ) Notice: Subject to any disclaimer, the term of this patent is extended or adjusted under 35 U.S.C. 154(b) by 55 days.

(21) Appl. No.: 16/063,031

(22) PCT Filed: Dec. 15, 2016

(86) PCT No.: PCT/US2016/066751
§ 371 (c)(1),
(2) Date: Jun. 15, 2018

(87) PCT Pub. No.: WO2017/106397
PCT Pub. Date: Jun. 22, 2017

(65) Prior Publication Data
US 2018/0367356 A1 Dec. 20, 2018

Related U.S. Application Data

(60) Provisional application No. 62/267,607, filed on Dec. 15, 2015.

(51) Int. Cl.
*H04L 27/26* (2006.01)
*H04L 27/00* (2006.01)
(Continued)

(52) U.S. Cl.
CPC ........ *H04L 27/2611* (2013.01); *H04B 7/0404* (2013.01); *H04B 7/0452* (2013.01);
(Continued)

(58) Field of Classification Search
CPC ............ H04L 27/2611; H04L 27/2692; H04L 27/0014; H04L 27/2691; H04L 2027/0095;
(Continued)

(56) References Cited

U.S. PATENT DOCUMENTS 6,434,131 B1 * 8/2002 Sari ................... H04B 1/71075
370/208
8,611,447 B1 * 12/2013 Gomadam ........... H04B 7/0452
375/260
(Continued)

OTHER PUBLICATIONS

International Search Report issued in PCT/US2016/066751 dated Mar. 16, 2017 (4 pages).
(Continued)

*Primary Examiner* — Ajay Cattungal
(74) *Attorney, Agent, or Firm* — Osha Liang LLP

(57) ABSTRACT

A client device includes a processor and an antenna. The client device obtains an announcement that specifies a winning client of a channel contention competition; identifies a group association of the client device using an identity of the winning client; transmits a preamble modulated by an entry of a preamble interference nullification matrix, the entry is based on the group association; and transmits, after transmitting the preamble, a data transmission. The preamble is transmitted at the same time as a second preamble is transmitted by a second client device.

19 Claims, 14 Drawing Sheets

(51) Int. Cl.
      *H04W 74/08*      (2009.01)
      *H04L 5/00*       (2006.01)
      *H04B 7/0452*     (2017.01)
      *H04B 7/0404*     (2017.01)
      *H04J 11/00*      (2006.01)

(52) U.S. Cl.
      CPC ........ *H04J 11/0046* (2013.01); *H04L 5/0048* (2013.01); *H04L 27/0014* (2013.01); *H04L 27/2691* (2013.01); *H04L 27/2692* (2013.01); *H04W 74/08* (2013.01); *H04L 2027/0095* (2013.01); *H04W 74/0841* (2013.01)

(58) Field of Classification Search
      CPC ................ H04L 5/0048; H04W 74/08; H04W 74/0841; H04B 7/0452; H04B 7/0404; H04J 11/0046
      See application file for complete search history.

(56) References Cited

U.S. PATENT DOCUMENTS

| | | | | |
|---|---|---|---|---|
| 9,143,274 | B2* | 9/2015 | Zeger | H04L 5/16 |
| 10,470,211 | B2* | 11/2019 | Kang | H04W 16/14 |
| 2009/0274105 | A1* | 11/2009 | Choi | H04L 27/2601 |
| | | | | 370/329 |
| 2011/0268094 | A1* | 11/2011 | Gong | H04L 1/1685 |
| | | | | 370/338 |
| 2012/0063409 | A1* | 3/2012 | Novak | H04L 5/0055 |
| | | | | 370/330 |
| 2013/0010748 | A1* | 1/2013 | Novak | H04W 72/1268 |
| | | | | 370/330 |
| 2014/0119288 | A1* | 5/2014 | Zhu | H04W 72/0406 |
| | | | | 370/329 |
| 2014/0269269 | A1* | 9/2014 | Kovvali | H04W 24/04 |
| | | | | 370/229 |
| 2014/0269524 | A1* | 9/2014 | Xiao | H04L 5/0053 |
| | | | | 370/329 |
| 2014/0348018 | A1* | 11/2014 | Bharadia | H04L 5/1423 |
| | | | | 370/252 |
| 2015/0023187 | A1* | 1/2015 | Koo | H04W 74/085 |
| | | | | 370/252 |
| 2015/0055546 | A1* | 2/2015 | Jafarian | H04W 72/0446 |
| | | | | 370/315 |
| 2015/0131491 | A1* | 5/2015 | Rikkinen | H04L 5/003 |
| | | | | 370/278 |
| 2015/0141034 | A1* | 5/2015 | Ekbatani | H04L 25/0204 |
| | | | | 455/456.1 |
| 2016/0007368 | A1* | 1/2016 | Moon | H04W 56/00 |
| | | | | 370/329 |
| 2016/0149683 | A1* | 5/2016 | Huang | H04L 5/0053 |
| | | | | 370/329 |

OTHER PUBLICATIONS

Written Opinion of the International Searching Authority issued in PCT/US2016/066751 dated Mar. 16, 2017 (7 pages).
International Preliminary Report on Patentability issued in corresponding International Application No. PCT/US2016/066751 dated Jun. 28, 2018 (9 pages).

* cited by examiner

| Channel Contention Winner | PIN Row |
|---|---|
| Client A | Row 1 |
| Client F | Row 2 |
| Client E | Row 3 |
| Client D | Row 4 |

FIG. 6B

| Channel Contention Winner | PIN Row |
|---|---|
| Client B | Row 1 |
| Client A | Row 2 |
| Client F | Row 3 |
| Client E | Row 4 |

FIG. 6C

DISTRIBUTED AND SCALABLE PHYSICAL LAYER AND MEDIUM ACCESS DESIGN FOR UPLINK MULTIUSER MULTIPLE-INPUT, MULTIPLE-OUTPUT (MU-MIMO) IN WIRELESS LOCAL AREA NETWORK (WLAN) SYSTEMS

STATEMENT REGARDING FEDERALLY SPONSORED RESEARCH OR DEVELOPMENT

The invention was made with government support under Grant Number CNS-1514285 awarded by the National Science Foundation. The invention was made with government support under Grant Number CNS-1444056 awarded by the National Science Foundation. The invention was made with government support under Grant Number CNS-1126478 awarded by the National Science Foundation. The government has certain rights in the invention.

BACKGROUND

Networks may enable the transmission of data between multiple client devices and a network access point. Links between the devices may be either wired or wireless. Data may be transmitted via wireless links to client devices that are not connected to the network via a wired link.

SUMMARY

In one aspect, a client device in accordance with one or more embodiments of the invention includes a processor and an antenna. The client device obtains an announcement that specifies a winning client of a channel contention competition; identifies a group association of the client device using an identity of the winning client; transmits a preamble modulated by an entry of a preamble interference nullification matrix, the entry is based on the group association; and transmits, after transmitting the preamble, a data transmission. The preamble is transmitted at the same time as a second preamble is transmitted by a second client device.

In one aspect, an access point in accordance with one or more embodiments of the invention includes a processor and an antenna array. The antenna array includes a number of antennas. The access point obtains an announcement that specifies a winning client of a channel contention competition; simultaneously receives a preamble from each client of a number of clients, the number of clients includes the winning client and a second client; simultaneously receives, after receiving the preamble from a client, a data transmission from each client of the number of clients; and removes interference, caused by simultaneous reception of the data transmission from each client, from each data transmission using the preamble corresponding to each client.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 6B shows a diagram of a group association of a first client device of the example system of FIG. 6A.

FIG. 6C shows a diagram of a group association of a second client device of the example system of FIG. 6A.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In general, embodiments of the invention relate to methods and systems for network communications. The network may include an access point that provides network access to any number of client devices. Each of the client devices may be connected to the network via the access point. Each of the clients may be spatially separated from each of the other client devices. Each of the client devices may be connected to the access point via a shared, wireless link. In one or more embodiments of the invention, a client device may be a laptop computer, a tablet computer, a cell phone, or any other type of computing device. The client device may be other types of devices without departing from the invention.

In one or more embodiments of the invention, data may be transmitted between the access point and multiple client devices simultaneously via the shared, wireless connection.

Interference caused the simultaneous data transmissions may be removed by transmitting, simultaneously by the client, preambles modulated by a dynamic orthogonal mapping matrix prior to the simultaneous data transmissions. Each of the preambles may include a number of symbols that have been modulated using a specific sequence, as will be discussed below. Channel state information for the channels between the access point and the clients may be derived from the simultaneously transmitted preambles. The channel state information may be used to remove the interferences introduced by the simultaneous transmission of the data transmissions by the clients.

In one or more embodiments of the invention, interference between the simultaneous data transmissions may be further reduced by applying distributed orthogonal spreading to reduce channel correlation of the channels used during the simultaneous data transmissions. Each client device may apply a phase shift delay and/or cyclic shift delay when performing the simultaneous data transmissions. In one or more embodiments of the invention, the phase shift delay and/or cyclic shift delay may also be applied when transmitting the high throughput preambles. In one or more embodiments of the invention, the phase shift delay and/or cyclic shift delay is applied when transmitting the high throughput preambles and the simultaneous data transmissions.

Figure 1:
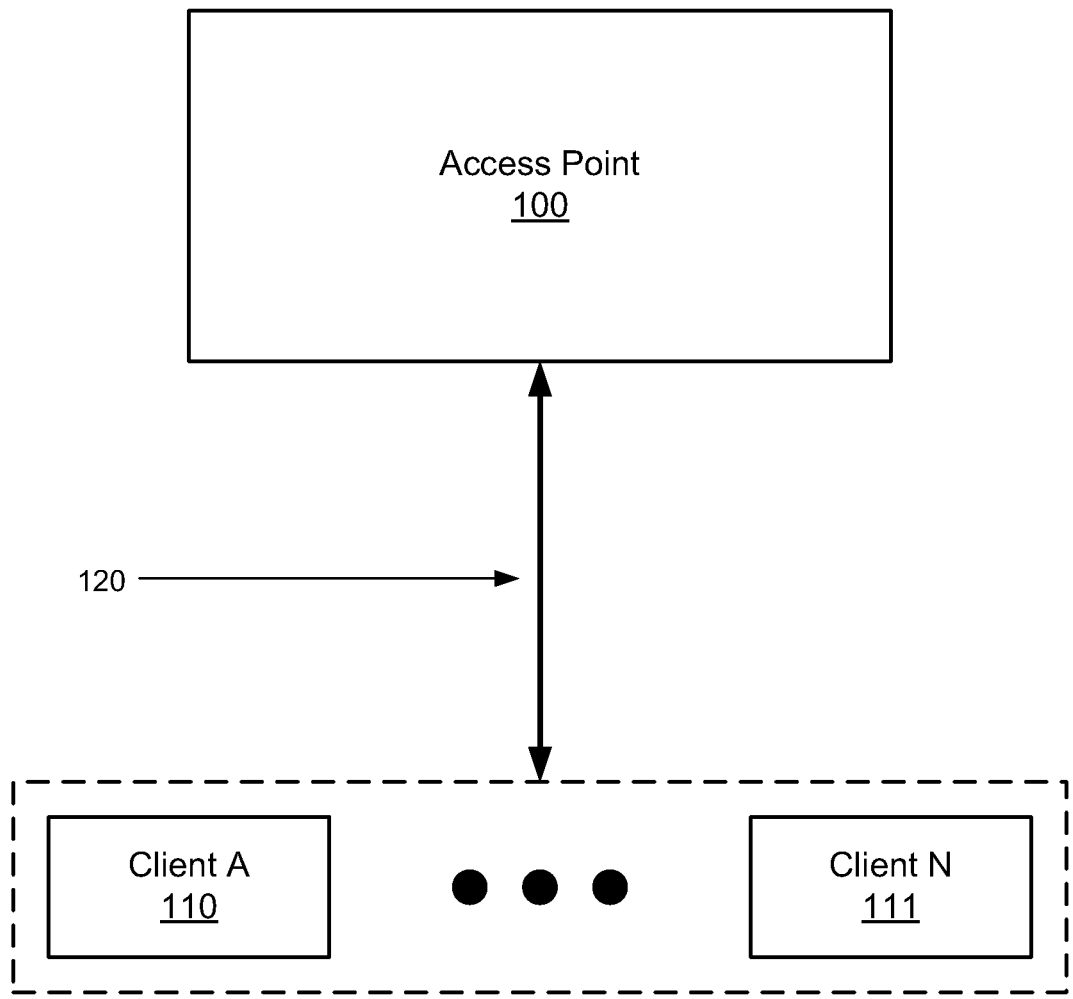
FIG. 1 shows a diagram of a network in accordance with one or more embodiments of the invention.

FIG. 1 shows a system in accordance with one or more embodiments of the invention. The system shown in FIG. 1 includes an access point (100) operably connected to a number of clients (110, 111) by a wireless connection (120). The access point (100) may provide network access to the client (110, 111) via the wireless connection (120). The access point (100) may be operably connected to a network (not shown).

In one or more embodiments of the invention, the clients (110, 111) may be configured to simultaneously transmit preambles and simultaneously transmit data to the access point (100) during a simultaneous transmission period. As used herein, simultaneously transmitting means transmitting by multiple client devices during the same period of time using the same frequency resources. In one or more embodiments of the invention, the preambles may be high throughput preambles. The simultaneous transmissions may be the same or different transmissions. By simultaneously transmitting data to the access point (100), a larger quantity of data may transmitted by the clients (110, 111) when compared to sequentially transmitting data, i.e., each client (110, 111) transmitting at different times.

Simultaneously transmitting data to the access (100) may cause interference between the simultaneous transmissions. By transmitting high throughput preambles before transmitting the data, the access point (100) may obtain channel state information and use the channel state information to remove the interference caused the by the simultaneous data transmissions.

Figure 2A:
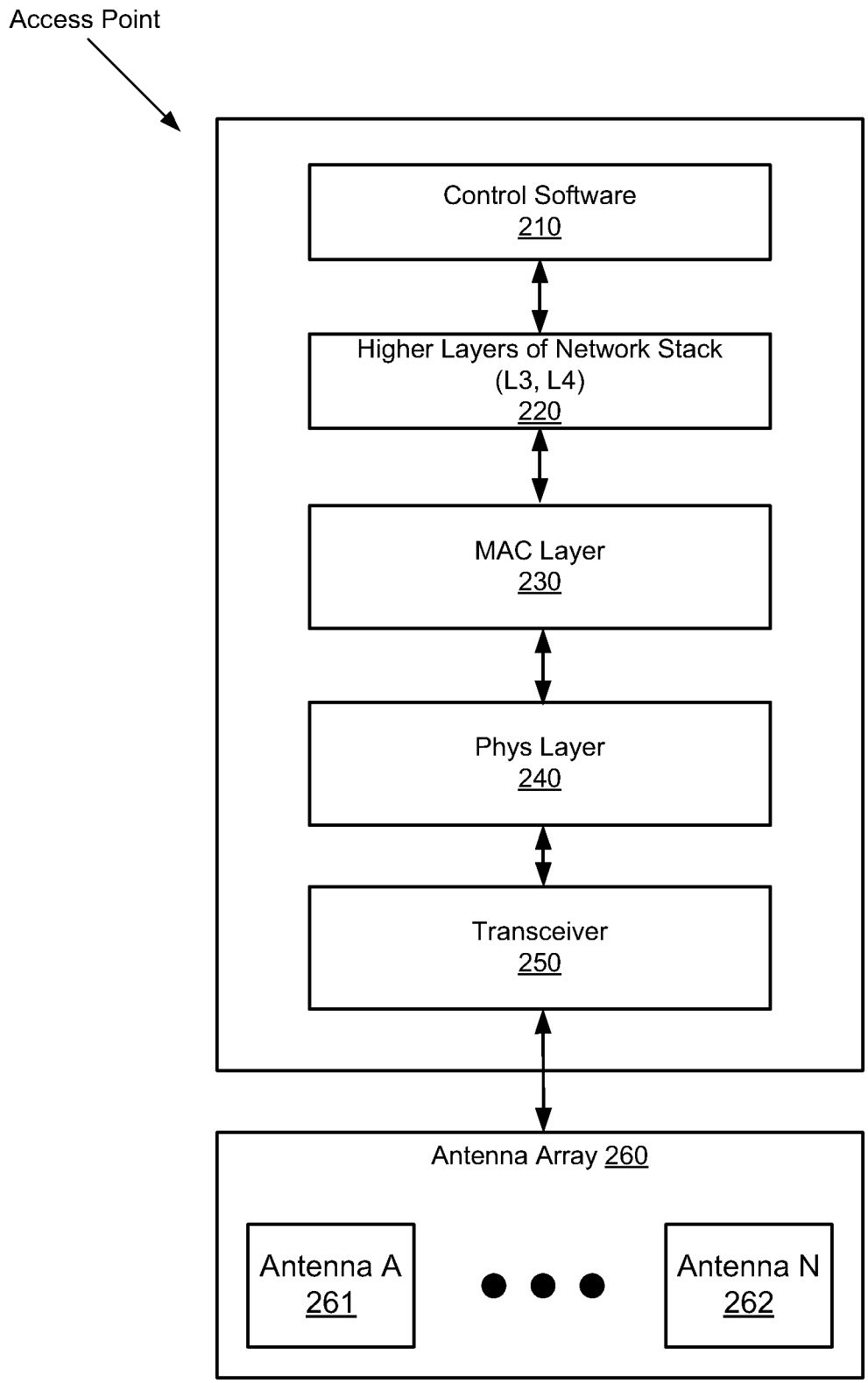
FIG. 2A shows a diagram of an access point in accordance with one or more embodiments of the invention.

FIG. 2A shows a diagram of an access point (100) in accordance with one or more embodiments of the invention. The access point (100) may be a communication device that provides network access to one or more clients. In one or more embodiments of the invention, the access point (100) is an open systems interconnection (OSI) model compatible communication device.

The access point (100) may include circuitry to provide the aforementioned network access functionality. The circuitry may include filters, amplifiers, modulators, digital signal processors, application integrated circuits, general purpose processors, programmable gate arrays, power converters, power supplies, antennas, antenna arrays, and/or other circuit elements. Additionally, the access point (100) may include instructions stored on a non-transitory computer readable media that when executed by the access point (100) provide the functionality shown in FIGS. 4A and 4B.

The access point (100) may include control software (210), higher layers of a network stack (220), a media access control (MAC) layer (230), a physical layer (240), a transceiver (250), and an antenna array (260). Each of the aforementioned components is described below.

The control software (210) may be an operating system or other management software that governs the operation of the access point (100). The control software (210) may provide other software executing on the access point (100) or operably connected to the access point (200) access to functionality of the access point (100) such as network communications, storage access, and/or provisioning of computing resources.

The higher layers of the network stack (220) may manage network connections and communication flow in order to support the Internet Protocol (IP) (or other layer 3 protocols) and the transmission control protocol (TCP) (or other layer 4 protocols).

The MAC layer (230) may provide, in addition to layer 2 functionality, special purpose functionality for handling of simultaneous data transmission by multiple clients. More specifically, the MAC layer (230) may provide client group selection functionality, multi-client transmission initiation functionality, and new client processing functionality. The client group selection functionality may enable the access point (100) to select a number of clients to transmit simultaneously. The multi-client transmission initiation functionality may enable the access point (100) to initiate a multi-client transmission during which simultaneous data transmission is performed. The new client processing functionality may enable the access point (100) to configure client devices to support simultaneous transmission of data. For additional details regarding the special purpose functionality of the MAC layer (230) see FIG. 2B.

The physical layer (240) may provide, in addition to layer 1 functionality, special purpose functionality for handling of simultaneous data transmission by clients. More specifically, the physical layer (240) may provide preamble interference nullification functionality. The preamble interference nullification functionality may enable the access point (100) to remove interference from each data transmission of multiple, simultaneously transmitted data transmissions. For additional details regarding the special purpose functionality of the physical layer (240) see FIG. 2C.

The transceiver (250) may transmit and/or receive electronic signals. When transmitting data, the transceiver (250) may generate a carrier signal and encode the data in the carrier signal. The generated signal may be transmitted to another device using the antenna array (260). When receiving data, the transceiver (250) may decode data encoded in a carrier signal received from another device. The carrier signal may be obtained from another device using the antenna array (260).

The antenna array (260) may enable electromagnetic signals to be sent and/or received. The antenna array (260) may include a number of antennas (261, 262). The antennas may be separate physical structures. Each of the antennas (261, 262) may be physically separated from one another but operated cooperatively to send and/or receive electromagnetic radiation.

Figure 2B:
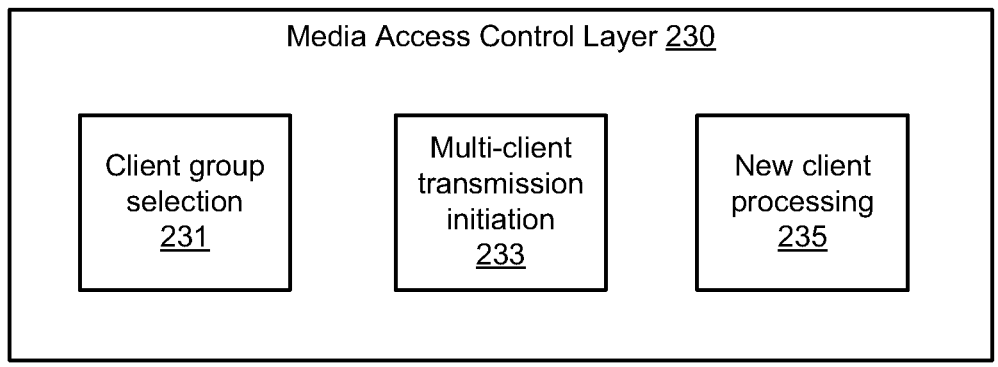
FIG. 2B shows a diagram of a media access control layer of an access point in accordance with one or more embodiments of the invention.

FIG. 2B shows a functionality diagram of a MAC layer (230) of an access point (100) in accordance with one or more embodiments of the invention. The MAC layer (230) may provide client group selection (231) functionality, multi-client transmission initiation (233) functionality, and new client processing (235) functionality in addition to OSI layer 2 functionality. Each functionality is discussed below.

Client group selection (231) functionality may enable the access point (100) to select multiple clients. The selected clients may be allowed to simultaneously transmit data during the next simultaneous transmission period. The multiple clients may be selected randomly, semi-randomly, or deterministically. The number of multiple clients selected may be based on the number of antennas of the antenna array of the access point. In one or more embodiments of the invention, the number of clients selected may be equal to the number of antennas of the antenna array of the access point.

In one or more embodiments of the invention, a random group of clients is selected for simultaneous transmission by the access point. The group of clients may be selected by any random process. For example, a random number generator may be used to selected clients sequentially until a quantity of selected clients is equal to the number of antennas of the antenna array of the access point.

Figure 4A:
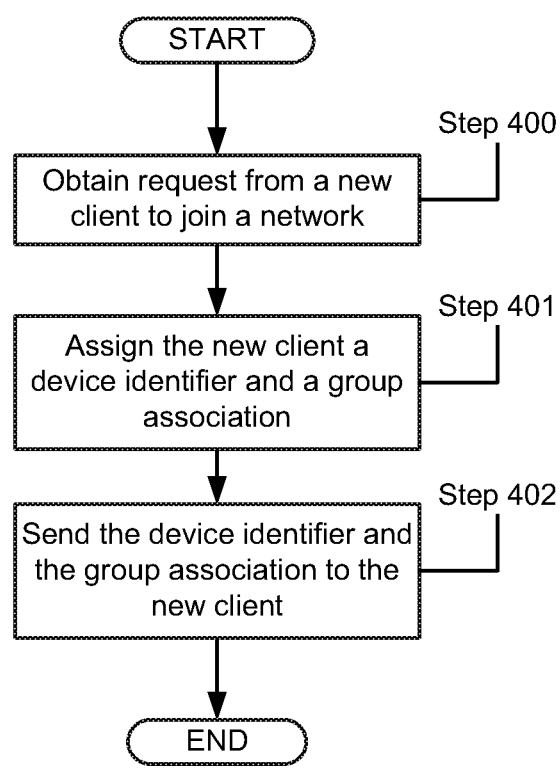
FIG. 4A shows a flowchart of a method of attaching clients to an access point in accordance with one or more embodiments of the invention.
Figure 4B:
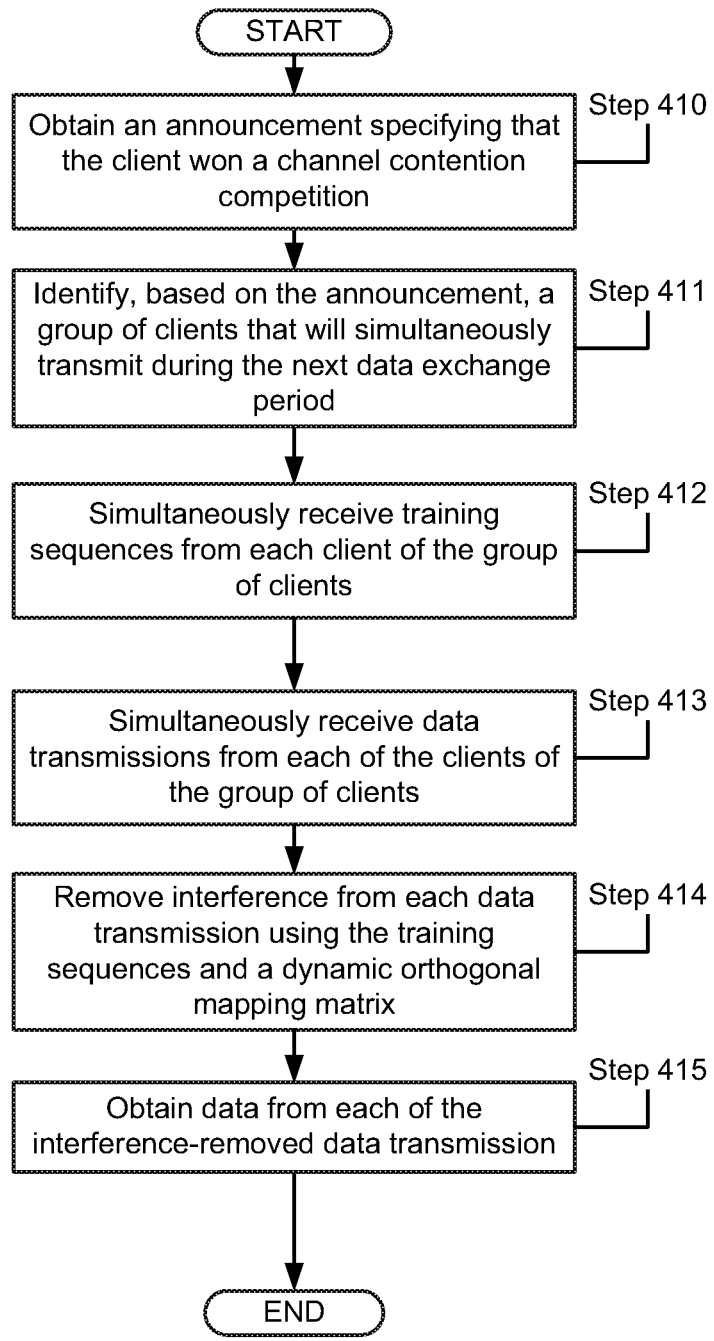
FIG. 4B shows a flowchart of a method of performing network communications by an access point in accordance with one or more embodiments of the invention.
Figure 4C:
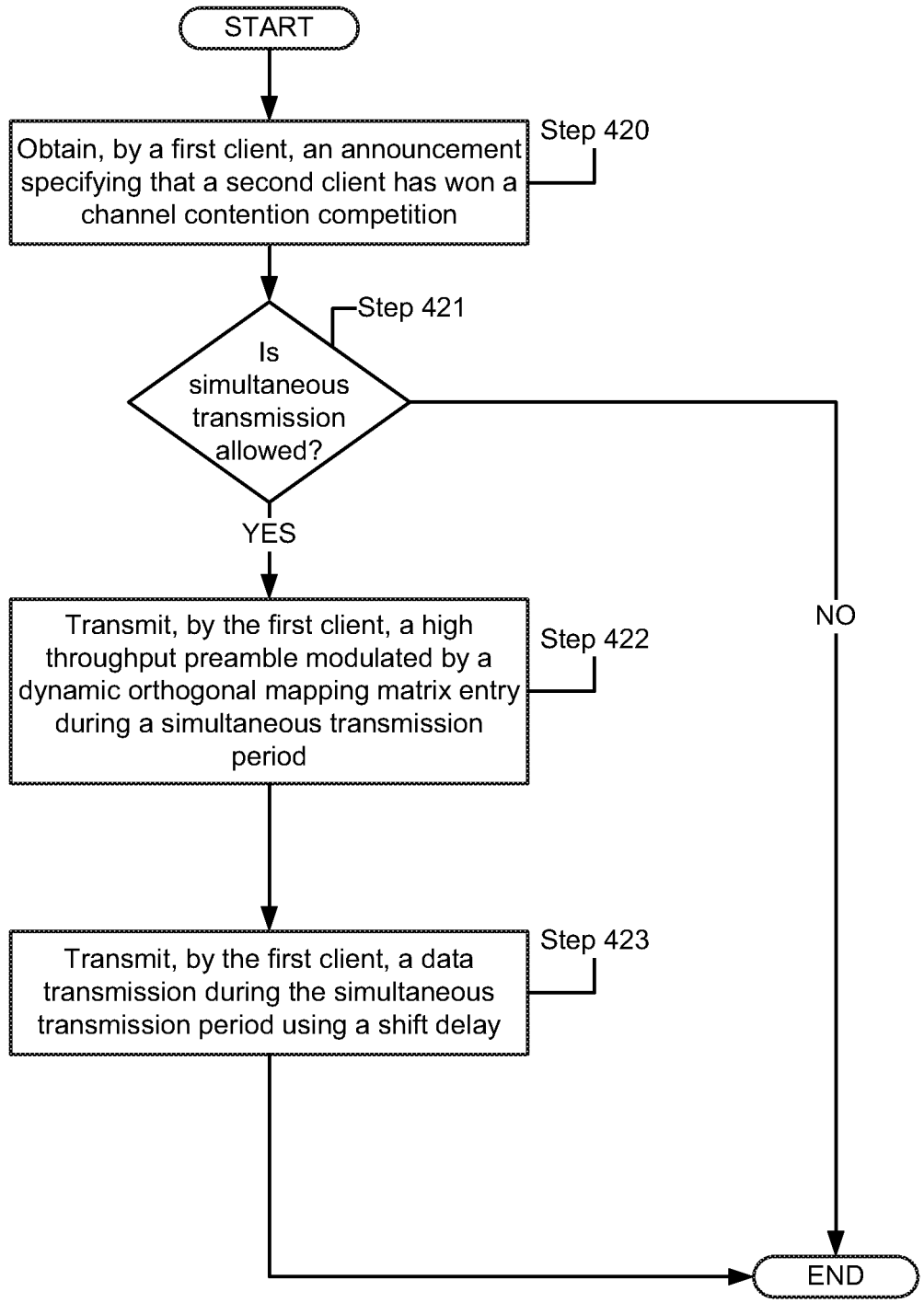
FIG. 4C shows a flowchart of a method of performing network communications by a client in accordance with one or more embodiments of the invention.
Figure 4D:
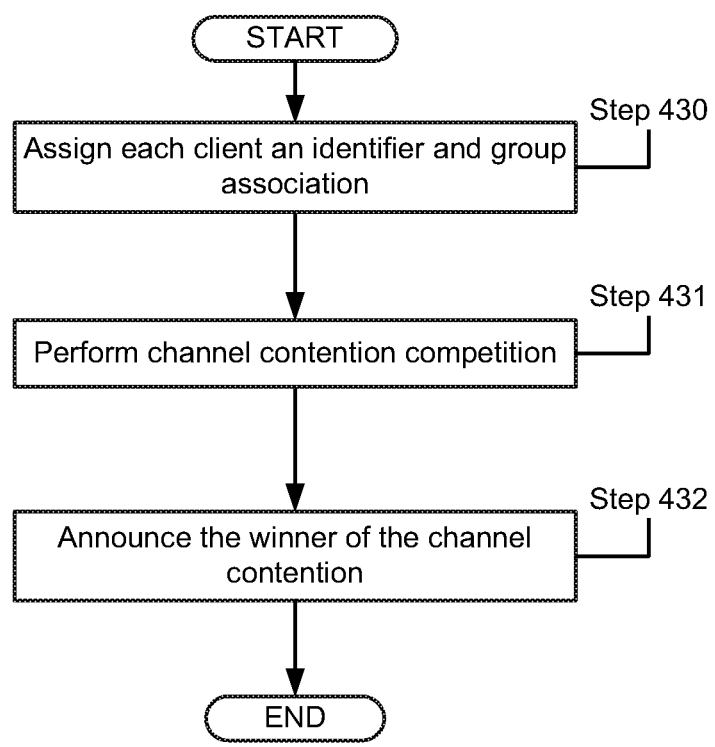
FIG. 4D shows a flowchart of a method of managing clients by an access point in accordance with one or more embodiments of the invention.

In one or more embodiments of the invention, a random group of clients may be selected based on the method shown in FIG. 4D.

Multi-client transmission initiation (233) functionality may enable the access point (100) to initiate a new simultaneous transmission period. The access point (100) may provide this functionality sending an acknowledgement of a previous simultaneous transmission period to each client operable connected to the access point (100). Sending the acknowledgement may initiate a new channel contention process and thereby begin a new simultaneous transmission period.

The new client processing (235) functionality may enable the access point (100) to configure clients for simultaneous transmission. The new client processing (235) functionality may be provided by performing the method shown in FIG. 2A.

Figure 2C:
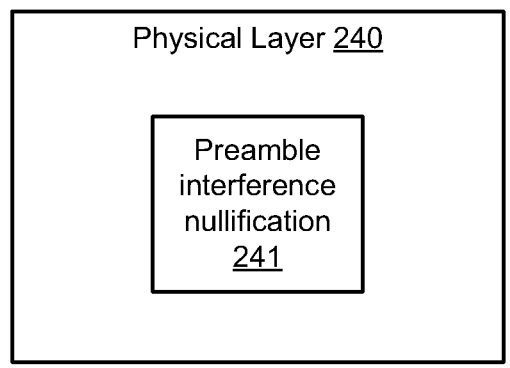
FIG. 2C shows a diagram of a physical layer of an access point in accordance with one or more embodiments of the invention.

FIG. 2C shows a functionality diagram of a physical layer (240) of an access point (100) in accordance with one or more embodiments of the invention. The physical layer (240) may provide preamble interference nullification (241) functionality in addition to OSI layer 1 functionality. The preamble interference nullification (241) functionality may enable the access point (100) to remove interference caused by simultaneous transmission of data during a simultaneous transmission period. The preamble interference nullification (241) functionality may be provided by performing the method shown in FIG. 4B.

Figure 3A:
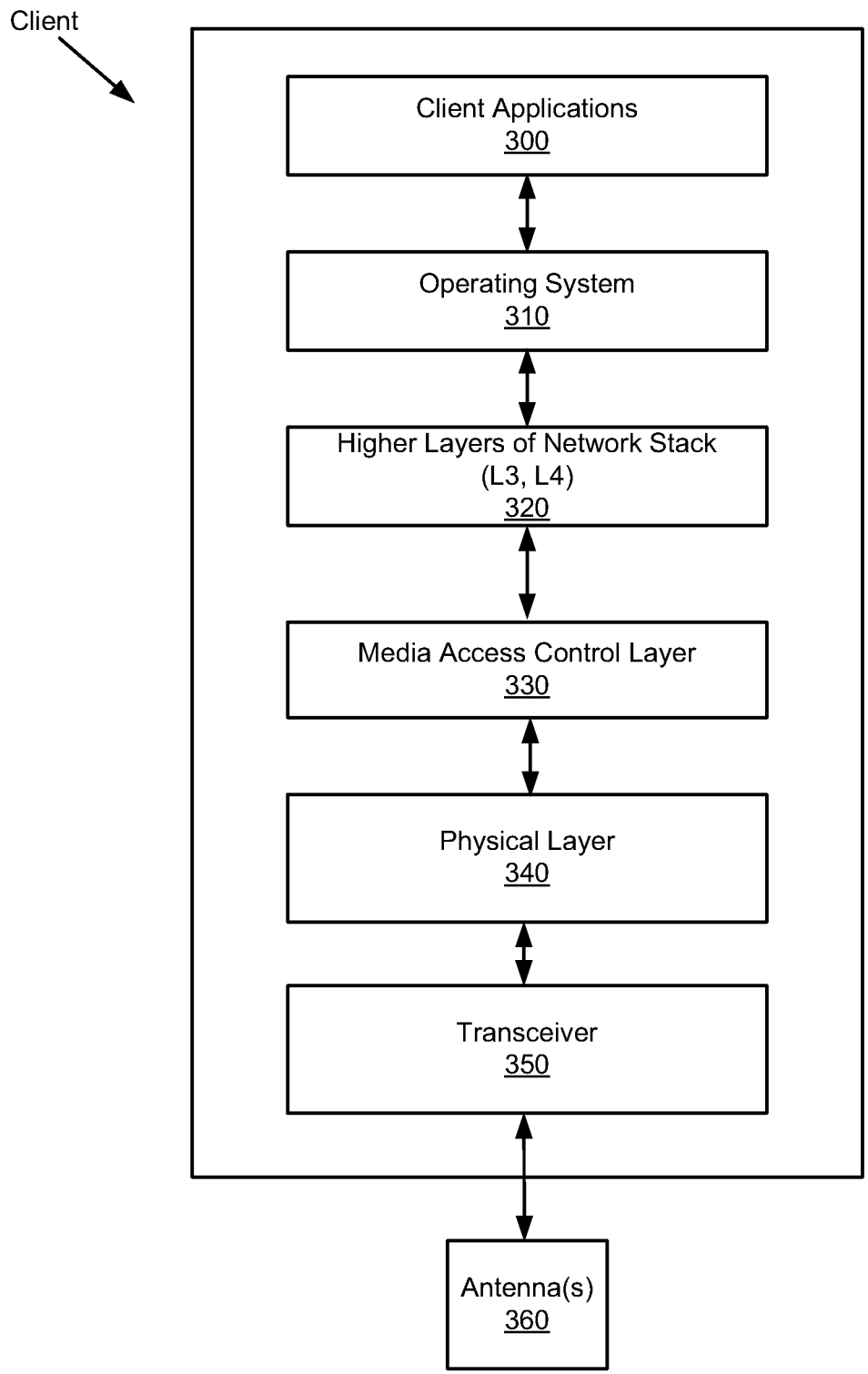
FIG. 3A shows a diagram of a client in accordance with one or more embodiments of the invention.

FIG. 3A shows a diagram of a client in accordance with one or more embodiments of the invention. The client may be a computing device that provides a user with access to a network. The client may provide this functionality to a user by exchanging data with an access point via a wireless connection.

The client may include circuitry to provide the aforementioned network access functionality. The circuitry may include filters, amplifiers, modulators, digital signal processors, application integrated circuits, general purpose processors, programmable gate arrays, power converters, power supplies, antennas, antenna arrays, and/or other circuit elements. Additionally, the client may include instructions stored on a non-transitory computer readable media that when executed by the client provide the functionality shown in FIG. 4C.

The client may include client applications (300), an operating system (310), high layers of the network stack (320), a media access control (MAC) layer (330), a physical layer (340), a transceiver (350), and one or more antennas (360). Each of the aforementioned components is described below.

The client applications (300) may be programs executing on the client or operably connected to the client. The client applications (300) may be, for example, web browsers, social media applications, email management software, or any other type of software.

The operating system (310) may be device management software that governs the operation of the client. The operating system (310) may provide other software, e.g., the client applications (300), executing on the client or operably connected to the client access to functionality of the client such as network communications, storage access, and/or provisioning of computing resources.

The higher layers of the network stack (320) may manage network connections and communication flow in order to support the Internet Protocol (IP) (or other layer 3 protocols) and the transmission control protocol (TCP) (or other layer 4 protocols).

The MAC layer (330) may provide, in addition to layer 2 functionality, special purpose functionality for handling of simultaneous data transmission by multiple clients. More specifically, the MAC layer (330) may provide channel contention processing functionality and multi-client transmission processing functionality. The channel contention processing (331) functionality may enable the client to determine which of the clients will transmit during the next simultaneous transmission period cooperatively with each of the other clients and the access point. The multi-client transmission processing (332) functionality may enable the client to transmit data to the access point at the same time at least one other client is also transmitting data to the access point. For additional details regarding the special purpose functionality of the MAC layer (330) see FIG. 3B.

The physical layer (340) may provide, in addition to layer 1 functionality, special purpose functionality for handling of simultaneous data transmission by clients. More specifically, the physical layer (340) may provide high throughput preamble generation (341) functionality and delay application (342) functionality. The high throughput preamble generation (341) functionality may enable the client to transmit special formed training patterns to the access point. The delay application (342) functionality may enable the client to apply phase or cyclic shift delays to transmissions to reduce channel correlation. For additional details regarding the special purpose functionality of the physical layer (340) see FIG. 3C.

The transceiver (350) may transmit and/or receive electronic signals. When transmitting data, the transceiver (350) may generate a carrier signal and encode the data in the carrier signal. The generated signal may be transmitted to another device using the one or more antennas (360). When receiving data, the transceiver (350) may decode data encoded in a carrier signal received from another device. The carrier signal may be obtained from another device using the one or more antennas (360).

The one or more antennas (360) may enable electromagnetic signals to be sent and/or received. The antennas may be separate physical structures.

Figure 3B:
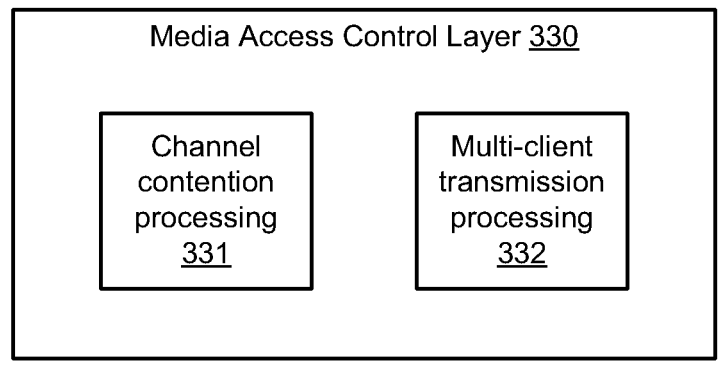
FIG. 3B shows a diagram of a media access control layer of a client in accordance with one or more embodiments of the invention.

FIG. 3B shows a functionality diagram of a MAC layer (330) of a client in accordance with one or more embodiments of the invention. The MAC layer (330) may provide channel contention processing (331) functionality and multi-client transmission processing (332) functionality. Each functionality is discussed below.

Channel contention processing (331) functionality may enable the client to determine whether the client will transmit during the next simultaneous transmission period cooperatively with the other clients and the access point. The channel contention processing (331) functionality may be provided by performing the method shown in FIG. 4E.

Figure 3C:
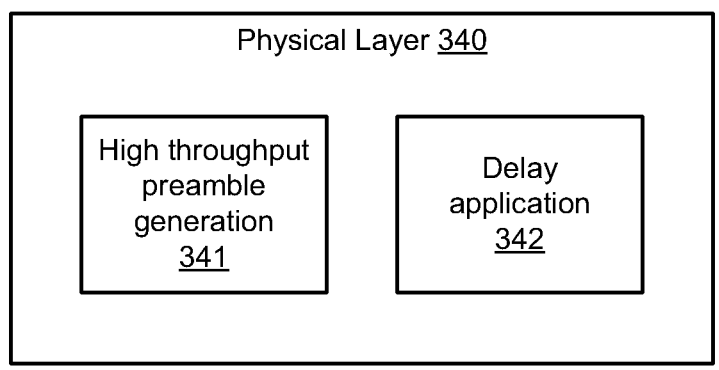
FIG. 3C shows a diagram of a physical layer of a client in accordance with one or more embodiments of the invention.

Multi-client transmission processing (233) functionality may enable the client to perform simultaneous transmissions of both data and high throughput preambles. The multi-client transmission processing (233) functionality may be provided by performing the method shown in FIG. 4C FIG. 3C shows a functionality diagram of a physical layer (340) of a client in accordance with one or more embodiments of the invention. The physical layer (340) may provide high throughput preamble generation (341) functionality and delay application (342) functionality in addition to OSI layer 1 functionality. Each functionality is discussed below.

The high throughput preamble generation (341) functionality may enable the client to generate training sequences. The training sequences, when received by an access point, may enable the access point to remove interference caused by simultaneous transmissions from multiple clients.

In one or more embodiments of the invention, the high throughput preamble generation (341) functionality includes generating a training sequence of symbols, e.g., preambles. The sequence may be a high throughput long training field including a number of symbols equal to the number of antennas of the antenna array of an access point with which the client is intending to communicate during the next simultaneous transmission period. The value of each symbol of the training sequence may be based on a previously announced identify of a client that won a channel contention competition, an association between the client and the announced client, and a preamble interference nullifier matrix.

The preamble interference nullifier (PIN) matrix may be an orthogonal mapping matrix including a number of rows and a number of columns that are equal to the number of antennas of the antenna array of an access point. For example, the preamble interference nullifier matrix may be a 4×4 matrix when an access point includes an antenna array that includes 4 antennas. Each row of the preamble interference nullifier matrix may include elements having a value of 1 or −1. For example, a 4×4 PIN matrix may be:

$$PIN = \begin{pmatrix} 1 & -1 & 1 & 1 \\ 1 & 1 & -1 & 1 \\ 1 & 1 & 1 & -1 \\ -1 & 1 & 1 & 1 \end{pmatrix}$$

Each row of the PIN matrix may correspond to the value of each symbol of a high throughput long training field for each client that is going to simultaneously transmit during the next simultaneous transmission period. In other words, the value of each symbol of the high throughput long training field may be multiplied by a value of +1 or −1 corresponding to the values of the row of the PIN matrix. For example, row one of the PIN matrix may correspond to the value of the symbols of the high throughput long training field for a first client, row two of the PIN matrix may correspond to the value of the symbols of the high throughput long training field for a second client, etc. Each client may use any row of the PIN matrix so long as another client doesn't use the same row and the access point is aware of which client is using which row of the PIN matrix.

In one or more embodiments of the invention, the row of the PIN matrix that corresponds to a client that is going to transmit during the next simultaneous transmission period may be based on the identity of another client that won the previous channel contention competition and a predetermined relationship between the clients. For example, when a client first attaches to an access point, the access point may provide the client with group association information that specifies which row of the PIN matrix the client will use when a particular client wins the channel contention competition.

The delay application (341) functionality may enable the client to apply a phase and/or cyclic shift delay to transmissions during simultaneous transmission periods. Applying delays to the transmission may reduce correlation between simultaneous transmissions and improve spatial diversity between each client. In one or more embodiments of the invention, the delay application (341) functionality may be provided by applying delay to a transmission using the following equation:

$$S_{CD}(f) = S(f)e^{-j2\pi f T_{DOS}}$$

where S(f) is the transmission before application of the delay, $T_{DOS}$ is the quantity of the delay, and $S_{CD}(f)$ is the transmission after the delay has been applied in a frequency domain representation.

In one or more embodiments of the invention, the quantity of the delay applied is between 100 and 700 nanoseconds.

FIG. 4A shows a flowchart in accordance with one or more embodiments of the invention. The method depicted in FIG. 4A may be used by an access point to perform new client processing in accordance with one or more embodiments of the invention. One or more steps shown in FIG. 4A may be omitted, repeated, and/or performed in a different order among different embodiments.

In Step 400, an access point obtains a request from a new client to join a network. The request may be obtained by the access point from a transmission received via a wireless link from the new client.

In Step 401, the access point assigns the new client identification information and/or group association information. The group association information may specify a group of other clients that the client will simultaneously transmit with when any of the other clients win a channel contention competition.

In one or more embodiments of the invention, the group association may specify multiple, different groups of clients.

In Step 402, the access point sends the identification information and/or the group association information to the new client. By transmitting the group association, the client may be notified that the access point supports simultaneous transmissions and of the groups of client devices with which the client will simultaneously transmit.

FIG. 4B shows a flowchart in accordance with one or more embodiments of the invention. The method depicted in FIG. 4B may be used by an access point to simultaneously receive information from multiple clients in accordance with one or more embodiments of the invention. One or more steps shown in FIG. 4B may be omitted, repeated, and/or performed in a different order among different embodiments.

In Step 410, an access point obtains an announcement specifying that a client has won a channel contention competition. The announcement may be received from the client that won the channel contention competition. For example, when a client wins a channel contention competition, the client may transmit an announcement and thereby notify each of the other clients and the access point that the client has won the competition.

In Step 411, the access point identifies a group of clients that will transmit during a simultaneous transmission period based on the identity of the client that won the channel contention competition. The group may be determined based on a pre-existing relationship between clients. For example, as discussed with respect to FIG. 4A, group associations between clients may be set by an access point whenever a new client associates to the access point.

By identifying the group of clients that will simultaneously transmit during the next data exchange period, the access point may determine which row of the PIN matrix each client will use to modulate a training sequence. Knowing the row of the PIN matrix that each client uses may enable the access point to remove interference caused by simultaneous transmissions during the next data exchange period.

In one or more embodiments of the invention, each client may be assigned a consecutively numbered identifier when it associates with an access point. Thus, all of the clients may have identifiers that are consecutively numbered. The group associations may simply specify that the client is a member of a group consisting of any client that wins a channel contention competition and has an identifier that is between the value of the identifier of the client and a second value of the number of clients that will simultaneously transmit subtracted from the client identifier. For example, if a client has an identifier of 12 and is attached to an access point that enables eight clients to simultaneous transmit, the client has a group association with any of clients 5 through 12. In other words, the client will transmit whenever a client having an identity of 5 through 12 wins a channel contention competition. The client will then, as will be discussed in Step 412, modulate a training sequence using a row of the PIN matrix. The row is specified by computing the difference in ID between the identifier of the client that won the competition and the identifier of the client and adding 1. In other words, if client 8 wins the competition, client 12 will use row 5 of the PIN matrix during the next simultaneous transmission. Similarly, if client 5 wins the competition, client 12 will use row 8 of the PIN matrix.

In one or more embodiments of the invention, the client identifier values may wrap. For example, if there are 12 clients and four will simultaneously transmit, when client 11 wins a channel contention competition clients 11, 12, 1, and 2 will transmit during the next simultaneous transmission period.

In Step 412, the access point simultaneously receives a training sequence from each client of the group of clients determined in step 411. Each training sequence may be a high throughput long training field having symbol values specified by a row of a PIN matrix.

In Step 413, the access point simultaneously receives data transmissions from each client of the group of clients determined in step 411. Each of the data transmission may include different data and interference caused by the other data transmissions. At least one of the data transmissions may not include any data. For example, one of the clients of the group of clients may be selected to transmit during the data transmission period but may not have/need to transmit any data during the data transmission period.

In Step 414, the access point removes from each data transmission the interference caused by the other data transmissions. In one or more embodiments of the invention, the access point may remove the interference from each data transmission by determining channel state information using the training sequences received in Step 411. More specifically, the received training sequences may be used to determine channel state information at the receiver.

For an access point having N antennas and N clients simultaneously transmitting, the signal received by the access point may include contributions from each of the N client simultaneous transmissions. In an example, an access point having two antennas receiving simultaneous transmissions from two clients may be modeled in the frequency domain using the following equation:

$$y_1^{sc} = \hat{h}_{11}^{sc} \cdot HTLTF + \hat{h}_{12}^{sc} \cdot HTLTF + z_1^{sc}$$

$$y_2^{sc} = \hat{h}_{21}^{sc} \cdot HTLTF + \hat{h}_{22}^{sc} \cdot HTLTF + z_2^{sc}$$

where $y_1^{sc}$ and $y_2^{sc}$ are the signals received by the first and second antennas of the antenna array of the access point, respectively, $\hat{h}_{11}$, $\hat{h}_{12}$, $\hat{h}_{21}$, $\hat{h}_{22}$ are the unknown channel states, HTLTF is the high throughput preamble training sequence, and $z_1^{sc}$ and $z_2^{sc}$ is the noise received by the first client and the second client, respectively.

To determine the value of all four unknown channel states, four independent measurements are required. Thus, linear combinations of the above equations are used to develop a system of four equations and four unknowns as follows:

$$y_{1,t_1}^{sc} = \hat{h}_{11}^{sc} \cdot HTLTF + \hat{h}_{12}^{sc} \cdot HTLTF + z_{1,t_1}^{sc}$$

$$y_{1,t_2}^{sc} = -\hat{h}_{11}^{sc} \cdot HTLTF + \hat{h}_{12}^{sc} \cdot HTLTF + z_{1,t_2}^{sc}$$

$$y_{2,t_1}^{sc} = \hat{h}_{21}^{sc} \cdot HTLTF + \hat{h}_{22}^{sc} \cdot HTLTF + z_{2,t_1}^{sc}$$

$$y_{2,t_2}^{sc} = -\hat{h}_{21}^{sc} \cdot HTLTF + \hat{h}_{22}^{sc} \cdot HTLTF + z_{2,t_2}^{sc}$$

where $y_{1,t_1}^{sc}$ and $y_{2,t_1}^{sc}$ are the signals received by the first and second antennas of the antenna array of the access point at a first time, respectively, $y_{1,t_2}^{sc}$ and $y_{2,t_2}^{sc}$ are the signals received by the first and second antennas of the antenna array of the access point at a second time, respectively, $\hat{h}_{11}$, $\hat{h}_{12}$, $\hat{h}_{21}$, $\hat{h}_{22}$ are the unknown channel states, HTLTF is the high throughput preamble training sequence, $z_{1,t_1}^{sc}$ and $z_{2,t_1}^{sc}$ are the interference received by the first client and the second client at a first time, respectively, and $z_{1,t_2}^{sc}$ and $z_{2,t_2}^{sc}$ are the interference received by the first client and the second client at a second time, respectively.

Applying the PIN matrix to the above system of four equations enables each of the channel states to be determined as follows:

$$\hat{h}_{11}^{sc} = \frac{y_{1,t_1}^{sc} - y_{1,t_2}^{sc}}{2 \cdot HTLTF}$$

$$\hat{h}_{12}^{sc} = \frac{y_{1,t_1}^{sc} + y_{1,t_2}^{sc}}{2 \cdot HTLTF}$$

$$\hat{h}_{21}^{sc} = \frac{y_{2,t_1}^{sc} - y_{2,t_2}^{sc}}{2 \cdot HTLTF}$$

$$\hat{h}_{22}^{sc} = \frac{y_{2,t_1}^{sc} + y_{2,t_2}^{sc}}{2 \cdot HTLTF}$$

Thus, each of the channel states may be estimated using the above system of equations. More generally, the channel states for each subcarrier of an access point having an antenna array with $N_{RX}$ antennas communicating with $N_{SS}$ clients may be determined using the following equation:

$$\begin{pmatrix} \hat{h}^{sc}_{1,1} & \hat{h}^{sc}_{1,2} & \cdots & \hat{h}^{sc}_{1,N_{SS}} \\ \hat{h}^{sc}_{2,1} & \hat{h}^{sc}_{2,2} & \cdots & \hat{h}^{sc}_{2,N} \\ \vdots & \vdots & \ddots & \vdots \\ \hat{h}^{sc}_{N_{RX},1} & \hat{h}^{sc}_{N_{RX},2} & \cdots & \hat{h}^{sc}_{N_{RX},N_{SS}} \end{pmatrix} =$$

$$\left[ Y^{sc}_{t_1} \middle| Y^{sc}_{t_1} \middle| \cdots \middle| Y^{sc}_{t_{N_{HTLTF}}} \right] \cdot \hat{P}^T \cdot \frac{1}{N_{HTLTF} \cdot HTLTF_k}$$

where $N_{HTLTF}$ is the normalized number of symbols included in the transmitted high throughput preamble, $HTLTF_k$ is the given subcarrier symbol K, Yt is the received signal vector for a given subcarrier sc that has dimensions of the number of receive antennas $N_{RX}$ by $N_{HTLTF}$, and $\hat{P}^T$ is the transpose of a subset of the PIN matrix.

Using the above equation, the channel state for each channel may be determined. Once the state of each channel is determined, the interference may be removed using the channel states and the signals received by the antennas of the antenna array when each of the clients are simultaneously transmitting data transmissions.

In Step 415, the access point obtains the data included in each simultaneous transmission from the interference-removed data transmission. In one or more embodiments of the invention, the access point may remove the interference from each data transmission by determining channel state information using the training sequences received in Step 411. More specifically, the received training sequences may be used to determine channel state information at the receiver. The channel states may be used to remove interference included in each transmission from each client caused by the simultaneous transmissions. Once the interference is removed, the data included in each simultaneous transmission may be decoded.

FIG. 4C shows a flowchart in accordance with one or more embodiments of the invention. The method depicted in FIG. 4C may be used by a client to transmit information in accordance with one or more embodiments of the invention. One or more steps shown in FIG. 4C may be omitted, repeated, and/or performed in a different order among different embodiments.

In Step 420, a first client may obtain an announcement from a second client specifying that the second client has won a channel contention competition. The first client may obtain the announcement by receiving a message or broadcast from the second client that includes the announcement.

In Step 421, the first client determines whether the first client is allowed to simultaneously transmit along with the second client during the next simultaneous transmission period. The first client may determine whether the first client is allowed to simultaneously transmit by comparing the second client to a group association of the first client. The group association may specify a number of other clients with which the first client is allowed to simultaneously transmit. If the second client is one of the other clients of the group association, the method may proceed to Step 422. If the second client is not one of the other clients specified by the group association, the method may end following Step 421. If the method ends following Step 421, the second client will remain silent during the next simultaneous transmission period. As used herein, remain silent means to not transmit, broadcast, or otherwise utilize a shared wireless link.

In Step 422, the first client may transmit a high throughput preamble modulated by a dynamic orthogonal mapping matrix entry during a simultaneous transmission period. The high throughput preamble may include a number of symbols. The dynamic orthogonal mapping matrix entry may be a row of the PIN matrix, discussed above. The row of the PIN matrix may have a same number of columns as the number of symbols of the high throughput preamble. Each column of the row of the PIN matrix may specify how a symbol is modulated, e.g., the value of the symbol may be multiplied by the corresponding value of the row of the PIN matrix.

In one or more embodiments of the invention, the row of the PIN matrix may be selected based on the group association used in Step 421 to determine whether the client will simultaneously transmit. The group association may, in addition to specifying a group of other clients, specify a row of the PIN matrix along with each client of the group of clients. Thus, whenever a second client of the group of other clients wins a channel contention competition, the first client may determine whether the first client will transmit during the next simultaneous transmission period and which row of the PIN matrix the first client will use to modulate the high throughput preamble.

For example, six clients may be attached to an access point. A first client may have group association information that specifies that the first client will simultaneously transmit along with each of clients two through four. The group association information may also specify that the first client uses the first row of the PIN matrix when the first client wins the channel contention competition, uses the second row of the PIN matrix when the second client wins the channel contention competition, uses the third row of the PIN matrix when the third client wins the channel contention competition, and uses the fourth row of the PIN matrix when the fourth client wins the channel contention competition. In other words, whenever a client wins a channel contention competition, the clients that will simultaneous transmit during the next simultaneous transmission periods use rows of the PIN matrix based on the winning client.

For example, a number of clients may be assigned consecutive identifiers. Whenever a client wins a channel contention competition, the winning client announces its identifier. The winning client may use the first row of the PIN matrix and clients having consecutively larger identifiers may use consecutive rows of the PIN matrix. For example, if there are six clients, four may simultaneously transmit, and the second client wins a channel contention competition, the second client may use the first row of the PIN matrix, third client may use the second row of the PIN matrix, fourth client may use the third row of the PIN matrix, and the fifth client may use the fourth row of the PIN matrix during the next simultaneous transmission period.

In one or more embodiments of the invention, the first client transmits the high throughput preamble at the same time the second client transmits a high throughput preamble that is modulated by a different row of the PIN matrix.

In one or more embodiments of the invention, a client that is scheduled to transmit during the next simultaneous transmission period does not transmit the high throughput long training field or data during the next simultaneous transmission period. In other words, the client may remain silent during the simultaneous transmission period.

In Step 423, the first client transmits a data transmission.

In one or more embodiments of the invention, the data transmission is transmitted by the first client at the same time a second client transmits a second data transmission. Each data transmission may include different data.

In one or more embodiments of the invention, the first client transmits the data transmission using a shift delay. In one or more embodiments of the invention, the shift delay is a phase shift. In one or more embodiments of the invention, the shift delay is a cyclic shift delay. In one or more embodiments of the invention, the cyclic shift delay is between 100 nanoseconds a 700 nanoseconds. Applying a shift delay may reduce the likelihood that a data transmission of the first client and a data transmission of the second client are correlated. The shift delay may improve diversity of the transmissions.

In one or more embodiments of the invention, the shift delay may be applied during step 422. In other words, the shift delay may be applied to the transmission of the high throughput preamble as well as the transmission of the data transmission.

The method may end following Step 423.

FIG. 4D shows a flowchart in accordance with one or more embodiments of the invention. The method depicted in FIG. 4D may be used by an access point to coordinate a simultaneous transmission in accordance with one or more embodiments of the invention. One or more steps shown in FIG. 4D may be omitted, repeated, and/or performed in a different order among different embodiments.

In Step 430, an access point may assign each client that is attached to the access point a client identification and a group association. Multiple clients may be attached to the access point.

In one or more embodiments of the invention, the group association may specify a group of the clients that are attached to the access point and a row of the PIN matrix associated with each client of the group of the clients.

In one or more embodiments of the invention, the access point may make assignments whenever a client attaches to the access point. For example, whenever a client attaches to the access point, the access point may transmit a client identifier and a group association to the client.

In one or more embodiments of the invention, the access point may reassign identification information and group associations to each client attached to the access point whenever a new client attaches to the access point. For example, when a new client attaches to the access point, the access point may need to update group associations so that a subset of the clients attached to the access point will simultaneously transmit whenever the new client wins a channel contention competition.

In Step 431, the access point performs a channel contention competition. As used here in, a channel contention competition refers to a process of selecting a single client that will transmit during the next simultaneous transmission period. The single client may be selected using any method. In one or more embodiments of the invention, the process may randomly a client, e.g., a random number generator. In one or more embodiments of the invention, the process may semi-randomly a client, e.g., results in the selection of client that has not recently won a channel contention competition. Other processes for selecting a winner of a channel contention competition may be used without departing from the invention.

In Step 432, the winner of the channel contention competition is announced. In one or more embodiments of the invention, the winner may be announced by having the client that won the channel contention competition broadcast a message to the access point and the other clients. The broadcast message may specify the identity of the client that won the channel contention competition. In one or more embodiments of the invention, the winner may be announced by an access point to which the winning client is associated or operably connected.

In one or more embodiments of the invention, broadcasting the winner of the channel contention competition may signal the beginning of a simultaneous transmission period. By signaling the beginning of the simultaneous transmission period, each client may synchronize transmission of both a high throughput preamble and a data transmission so that each client transmits them simultaneously with the other clients.

The method may end following Step 432.

Figure 4E:
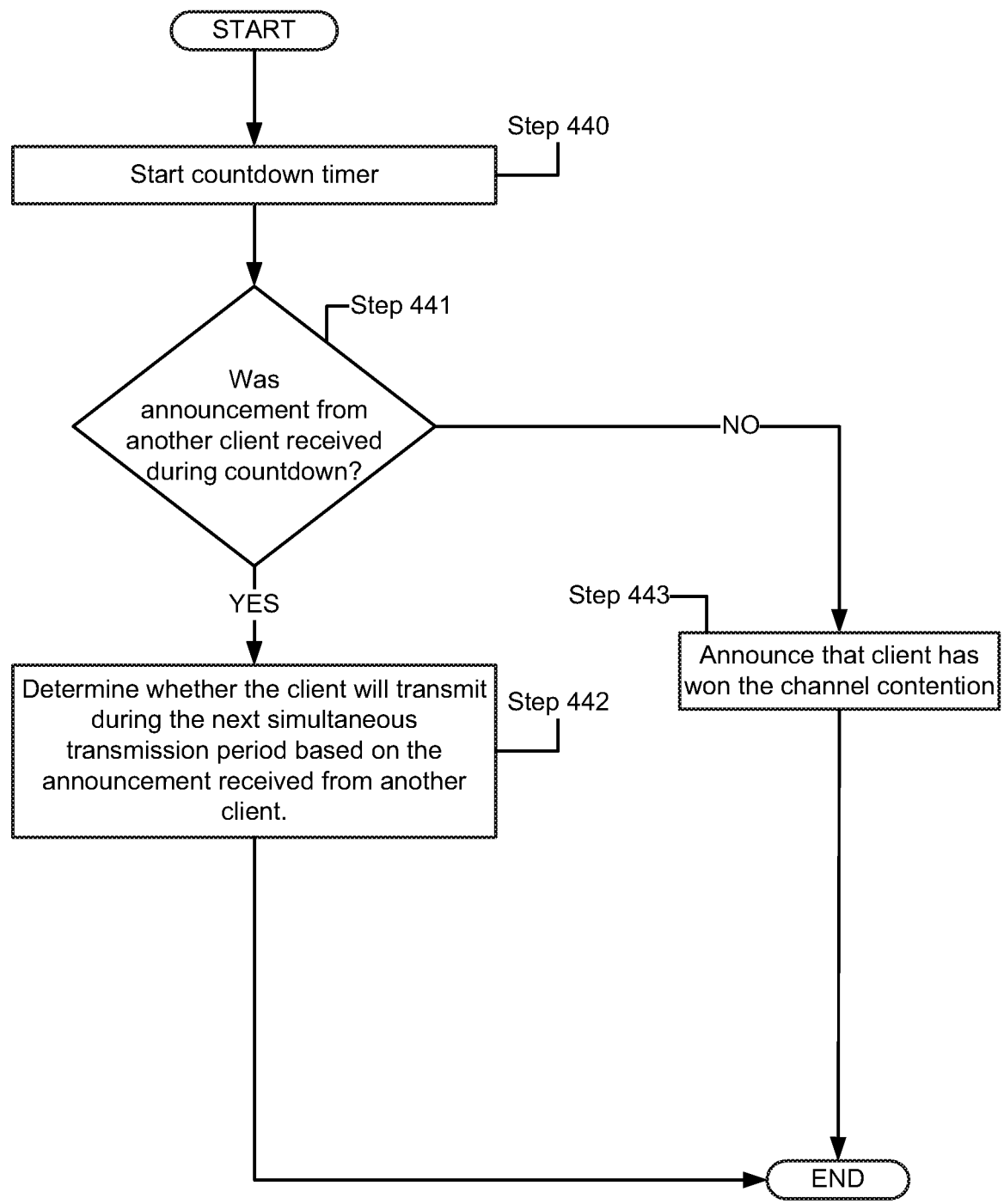
FIG. 4E shows a flowchart of a method of managing a transmission medium by a client in accordance with one or more embodiments of the invention.

FIG. 4E shows a flowchart in accordance with one or more embodiments of the invention. The method depicted in FIG. 4E may be used by a client to participate in a channel contention competition in accordance with one or more embodiments of the invention. One or more steps shown in FIG. 4E may be omitted, repeated, and/or performed in a different order among different embodiments.

In Step 440, a client may start a countdown time. In one or more embodiments of the invention, the initial value of the countdown timer is set random. In one or more embodiments of the invention, the initial value is set to a previous value, e.g., a value at the end of a previous channel contention competition.

In Step 441, the client determines whether an announcement was received from another client before the countdown timer finishes counting down. If the client determines that an announcement was received from another client, the method may proceed to Step 442. If an announcement is not received before the countdown timer finishes counting down, the method may proceed to Step 443.

In Step 442, the client determines whether the client will transmit during the next simultaneous transmission period by comparing an identity of another client included in the announcement to a group association. The method may end following Step 443.

In one or more embodiments of the invention, the client may suspend the countdown of the countdown timer or otherwise record the value of the countdown timer when an announcement is received from another client. The client may use the value of the countdown timer as an initial value of the countdown timer in a subsequent channel contention competition.

In Step 443, the client broadcasts an announcement to an access point and other client attached to the access point. The announcement may specify the identity of the client and that the client won the channel contention competition. The method may end following Step 443.

Figure 5:
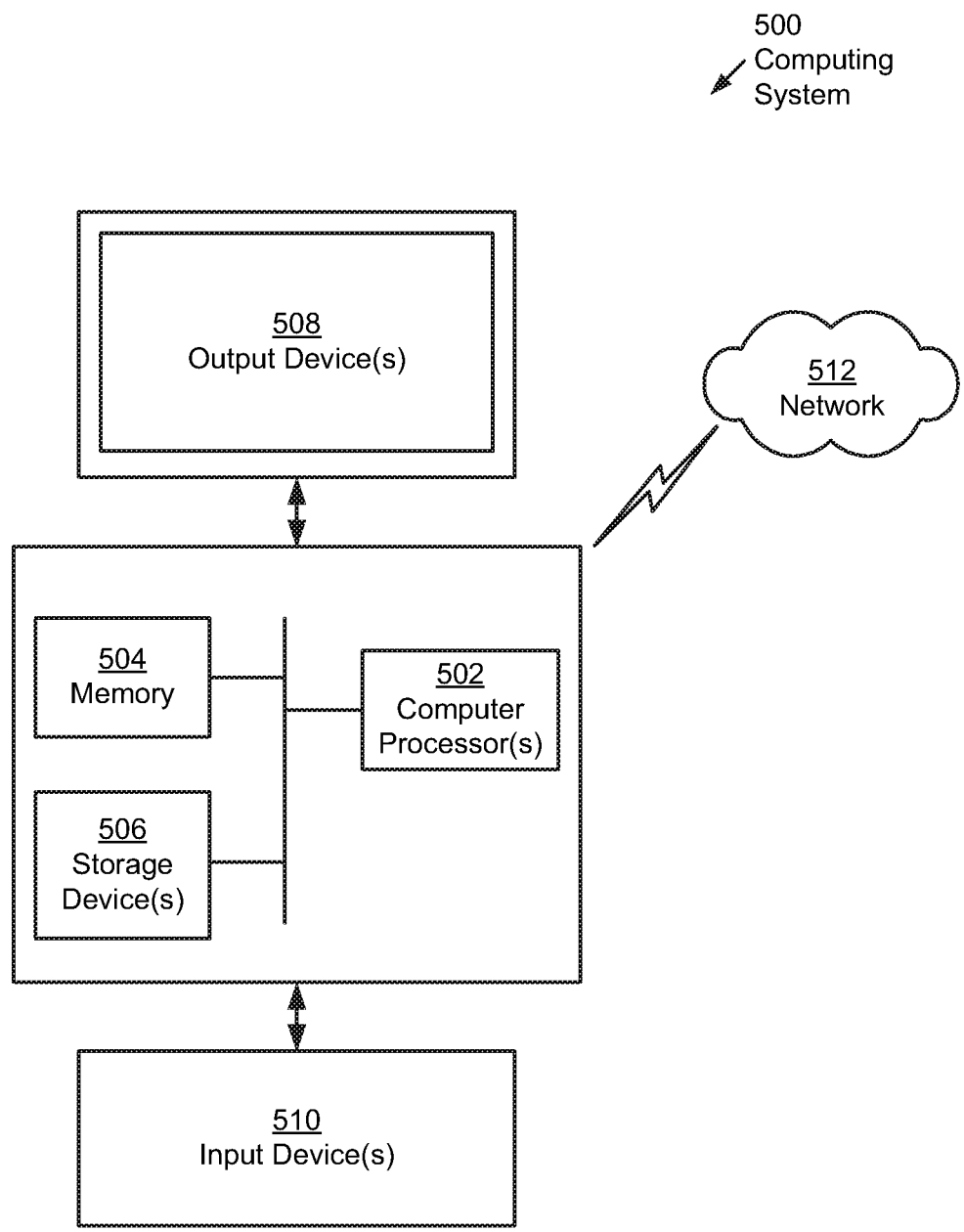
FIG. 5 shows a diagram of a computing system in accordance with one or more embodiments of the invention.

Embodiments of the invention may be implemented on a computing system. Any combination of mobile, desktop, server, embedded, or other types of hardware may be used. For example, as shown in FIG. 5, the computing system (500) may include one or more computer processor(s) (502), associated memory (504) (e.g., random access memory (RAM), cache memory, flash memory, etc.), one or more storage device(s) (505) (e.g., a hard disk, an optical drive such as a compact disk (CD) drive or digital versatile disk (DVD) drive, a flash memory stick, etc.), and numerous other elements and functionalities. The computer processor(s) (502) may be an integrated circuit for processing instructions. For example, the computer processor(s) may be one or more cores, or micro-cores of a processor. The computing system (500) may also include one or more input device(s) (510), such as a touchscreen, keyboard, mouse, microphone, touchpad, electronic pen, or any other type of input device. Further, the computing system (500) may include one or more output device(s) (508), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (500) may be connected to a network (512) (e.g., a local area network (LAN), a wide area network (WAN) such as the Internet, mobile network, or any other type of network) via a network interface connection (not shown). The input and output device(s) may be locally or remotely (e.g., via the network (512)) connected to the computer processor(s) (502), memory (504), and storage device(s) (505). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code, that when executed by a processor(s), is configured to perform embodiments of the invention.

Further, one or more elements of the aforementioned computing system (500) may be located at a remote location and connected to the other elements over a network (512). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

The following is an explanatory example of a communication system in accordance with embodiments of the invention.

Figure 6A:
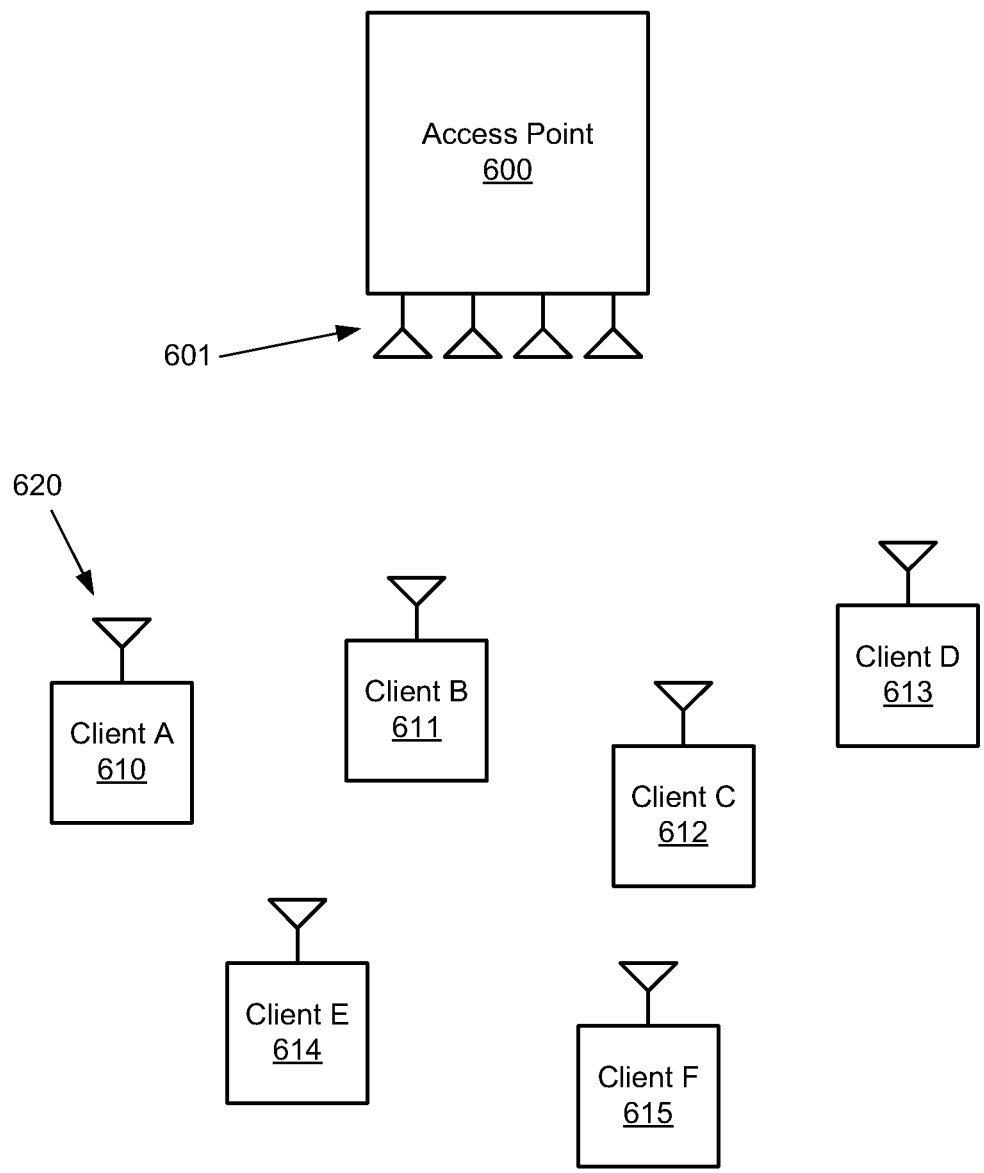
FIG. 6A shows a diagram of an example system in accordance with one or more embodiments of the invention.

FIG. 6A shows a communication system in accordance with embodiments of the invention. The communication system includes an access point (600) and a number of clients (610, 611, 612, 613, 614, 615). The access point (600) includes an antenna array (601) that includes four antennas. Each of the clients includes an antenna (620). Each of the clients communicates with the access point via a wireless link.

When each of the clients attached to the access point (600), each client was assigned a group association. The group association specifies whether a client will simultaneously transmit during a next simultaneous transmission period based on an identity of a winner of a channel contention competition. The group association also specifies which row of a preamble interference nullification matrix a client will use to modulate the symbols a high throughput preamble when the client transmits during a simultaneous transmission period.

FIG. 6B shows an example of a group association of client A (610). The group association was assigned to client A (610), by the access point (600), when client A (610) attached to the access point (610). The group association specifies that when client A wins the channel contention competition, client A will use row 1 of the PIN matrix. The group association also specifies that when client F wins the channel contention competition, client A will use row 2 of the PIN matrix. The group association further specifies that when client E wins the channel contention competition, client A will use row 3 of the PIN matrix. The group association additionally specifies that when client D wins the channel contention competition, client A will use row 4 of the PIN matrix. The group association lastly specifies that when either of client B or client C wins the channel contention competition, client A will not transmit during the next simultaneous transmission period.

FIG. 6C shows an example of a group association of client B (611). The group association was assigned to client B (611), by the access point (600), when client B (611) attached to the access point (610). The group association specifies that when client B wins the channel contention competition, client B will use row 1 of the PIN matrix. The group association also specifies that when client A wins the channel contention competition, client B will use row 2 of the PIN matrix. The group association further specifies that when client F wins the channel contention competition, client B will use row 3 of the PIN matrix. The group association additionally specifies that when client E wins the channel contention competition, client B will use row 4 of the PIN matrix. The group association lastly specifies that when either of client C or client D wins the channel contention competition, client B will not transmit during the next simultaneous transmission period.

Figure 6D:
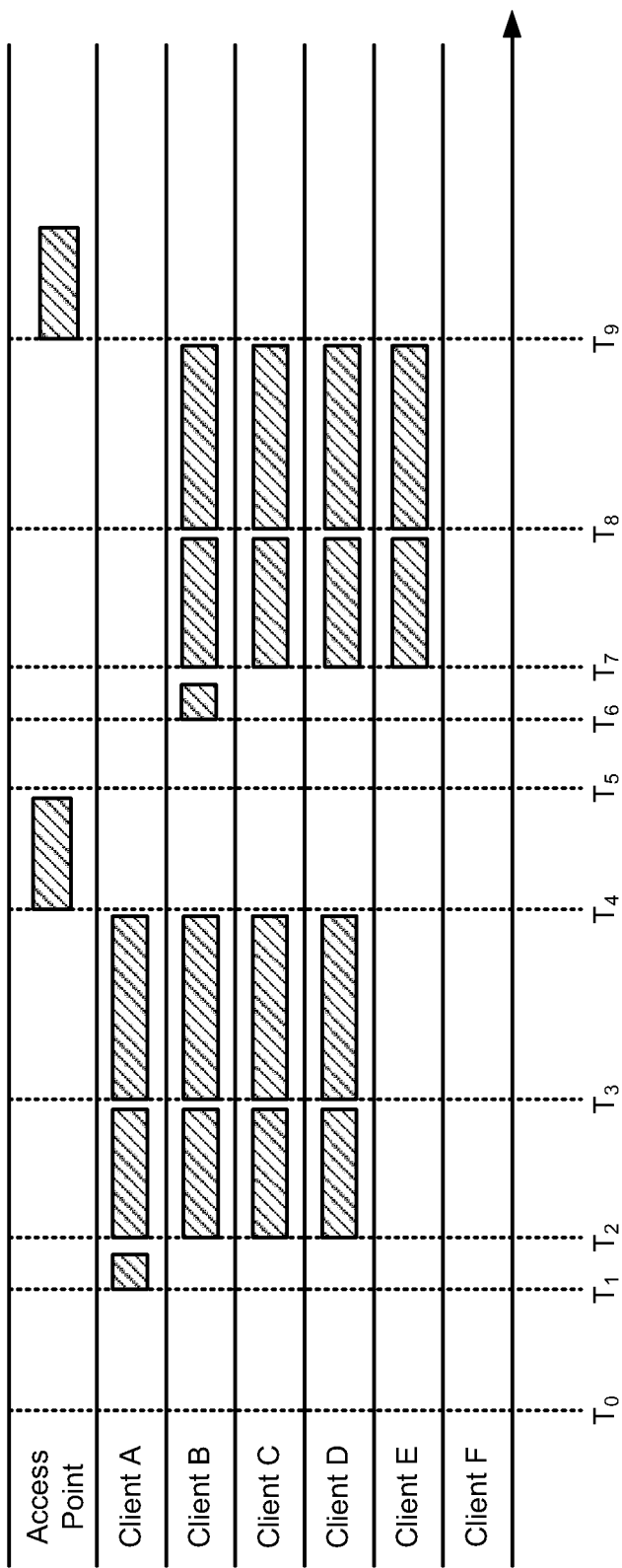
FIG. 6D shows a diagram of a timeline of operations performed by the example system of FIG. 6A.

FIG. 6D shows a timeline of a series of communications performed by the communication system shown in FIG. 6A. In the timeline shown in FIG. 6D, time increases from left to right. Each row of the time line indicates whether a client or access point is transmitting during each time period. For example, at Time $T_1$ client A is transmitting as indicated by the partially-filled box in row 2 of the timeline. In another example, at time $T_3$ the access point is transmitting as indicated by the partially-filled box in row 1 between $T_3$ and $T_4$.

In the timeline, at time $T_0$ a channel contention competition is initiated. During the competition, each client may perform the method shown in FIG. 4E.

At time $T_1$, client A won the channel contention competition. In response to winning the competition, client A broadcasts an announcement to each of the clients and the access point. The announcement specifies that client A won the competition. In response to receiving the announcement, each of the clients compares the client specified in the announcement to the client's group association information to determine whether the client will transmit during the next simultaneous transmission period and which row of the PIN matrix the client will use if transmitting.

At time $T_2$, each of clients A, B, C, and D simultaneously transmit preambles to the access point. Each of the clients A, B, C, and D modulate the symbols of the preambles using different rows of the PIN matrix. For example, with respect to client A, the client will use row 1 of the PIN matrix as specified by row 1 of the group association of client A shown in FIG. 6B. Client B will use row 2 of the PIN matrix as specified by row 2 of the group association of client B shown in FIG. 6C. Each of the preambles are transmitted by each of the clients using shift offsets between 50 and 750 nanoseconds.

At time $T_3$, each of clients A, B, C, and D simultaneously transmit data transmissions to the access point. Each of the data transmissions are transmitted by each of the client using the same shift offsets, between 50 and 750 nanoseconds, used to transmit the preambles at $T_2$.

At time $T_4$, the access point transmits acknowledgements to each of clients A, B, C, and D.

At time $T_5$ a second channel contention competition is initiated.

At time $T_6$, client B won the channel contention competition. In response to winning the competition, client B broadcasts an announcement to each of the clients and the access point. The announcement specifies that client B won the competition. In response to receiving the announcement, each of the clients compares the client specified in the announcement to the client's group association information to determine whether the client will transmit during the next simultaneous transmission period and which row of the PIN matrix the client will use if transmitting.

At time $T_7$, each of clients B, C, D, and E simultaneously transmit preambles to the access point. Each of the clients B, C, D, and E modulate the symbols of the preambles using different rows of the PIN matrix. For example, with respect to client B, the client will use row 1 of the PIN matrix as specified by row 1 of the group association of client B shown in FIG. 6C. In contrast, client A will not transmit because the group association in FIG. 6B does not specify a row of the PIN matrix for client A to use when client B wins the channel contention competition.

At time $T_9$, the access point transmits acknowledgements to each of clients A, D, E, and F.

Thus, as seen from FIGS. 6A-6D, the method may be repeated indefinitely.

Embodiments of the invention may provide one or more of the following advantages: (i) embodiments of the invention may enable multiple clients to simultaneously transmit data to an access point, (ii) embodiments of the invention may improve a data transmission capacity of a wireless network by enabling multiple client to simultaneously transmit data, and (iii) embodiments of the invention may enable multiple client to simultaneously transmit data to an access point without utilizing a control channel.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A client device, comprising:
a processor; and
an antenna,
wherein the client device is programmed to:
obtain an announcement that specifies a winning client of a channel contention competition;
identify a group association of the client device using an identity of the winning client;
transmit a preamble modulated by an entry of a preamble interference nullification matrix, wherein the entry is based on the group association; and
transmit, after transmitting the preamble, a data transmission,
wherein the preamble is transmitted at the same time as a second preamble is transmitted by a second client device.

2. The client device of claim 1, wherein the data transmission is transmitted at the same time as a second data transmission is transmitted by the second client device.

3. The client device of claim 2, wherein the client device is further programmed to:
obtain a second announcement that specifies a second winning client of a channel contention competition;
compare an identity of the second winning client to the group association of the client device, wherein the identity of the second winning client is not specified by the group association; and
remain silent during a simultaneous transmission period after obtaining the announcement.

4. The client device of claim 1, wherein the data transmission is transmitted using a shift delay.

5. The client device of claim 4, wherein the shift delay is a cyclic shift delay.

6. The client device of claim 5, wherein the cyclic shift delay is between 50 nanoseconds and 750 nanoseconds.

7. The client device of claim 1, wherein the group association specifies:
a plurality of clients, and
entries of the preamble interference nullification matrix associated with each client of the plurality of clients.

8. The client device of claim 7, wherein the preamble is a high throughput preambles that comprises a plurality of symbols, wherein each symbol of the plurality of symbols is modulated by a corresponding element of the entry of the preamble interference nullification matrix.

9. The client device of claim 1, wherein obtaining the announcement comprises:
receiving a transmission from the winning client,
wherein the transmission comprises the announcement.

10. The client device of claim 1, wherein the entry of the preamble interference nullification matrix used by the first client to modulate the preamble is different than a second entry of the preamble interference nullification matrix used by the second client to transmit the second preamble.

11. An access point, comprising:
a processor; and
an antenna array comprising a plurality of antennas,
wherein the access point is programmed to:
obtain an announcement that specifies a winning client of a channel contention competition;
simultaneously receive a preamble from each client of a plurality of clients, wherein the plurality of clients comprises the winning client and a second client;
simultaneously receive, after receiving the preamble from a client, a data transmission from each client of the plurality of clients; and
remove interference, caused by simultaneous reception of the data transmission from each client, from each data transmission using the preamble corresponding to each client;
wherein each preamble is a high throughput preamble that comprises a plurality of symbols, wherein each symbol of the plurality of symbols is modulated by an entry of a preamble interference nullification matrix.

12. The access point of claim 11, wherein a quantity of antennas of the plurality of antennas is the same as a quantity of clients of the plurality of clients.

13. The access point of claim 11, wherein each high throughput preamble is modulated using different entries of the preamble interference nullification matrix; wherein each entry is a row of the preamble interference nullification matrix.

14. The access point of claim 13, wherein each row of the preamble interference nullification matrix comprises a series of values that is different than each other row of the preamble interference nullification matrix.

15. The access point of claim 11, wherein the access point is further programmed to:
before obtaining the announcement:
assign the winning client a first group association, and
assign the second client a second group association,
wherein the first group association specifies that the second client simultaneously transmits when the winning client wins the channel contention competition.

16. The access point of claim 15, wherein the first group association specifies that the first client simultaneously transmits when the second client wins a second channel contention competition.

17. The access point of claim 15, wherein the first group association specifies that the first client does not simultaneously transmit when the second client wins a second channel contention competition.

18. The access point of claim 11, wherein the data transmission received from the winning client is different from the data transmission received from the second client.

19. The access point of claim 11, wherein removing interference from each data transmission comprises:
determining channel state information for each channel between the access point and the plurality of clients;
using the channel state information associated with the winning client to remove the interference from the data transmission from the winning client; and
using the channel state information associated with the second client to remove the interference from the data transmission from the second client.

* * * * *